(12) United States Patent
Jakubowski et al.

(10) Patent No.: US 11,317,599 B2
(45) Date of Patent: May 3, 2022

(54) FOLDABLE ANIMAL LITTER CONTAINING APPARATUS

(71) Applicant: Vermont Juvenile Furniture Mfg., Inc., West Rutland, VT (US)

(72) Inventors: Chris Jakubowski, Rutland, VT (US); Todd Jakubowski, Rutland, VT (US); Kristen Jakubowski, Rutland, VT (US)

(73) Assignee: Vermont Juvenile Furniture Mfg., Inc., West Rutland, VT (US)

( * ) Notice: Subject to any disclaimer, the term of this patent is extended or adjusted under 35 U.S.C. 154(b) by 313 days.

(21) Appl. No.: 16/585,775

(22) Filed: Sep. 27, 2019

(65) Prior Publication Data

US 2020/0100452 A1    Apr. 2, 2020

Related U.S. Application Data

(60) Provisional application No. 62/739,520, filed on Oct. 1, 2018.

(51) Int. Cl.
*A01K 1/01*    (2006.01)

(52) U.S. Cl.
CPC .................. *A01K 1/0125* (2013.01)

(58) Field of Classification Search
CPC .... A01K 1/0107; A01K 1/033; A01K 1/0125; A01K 1/00; A01K 1/0236; A01K 1/0245; A01K 1/034; A01K 31/07; A01K 31/08
USPC .......... 119/168, 165, 482, 161, 472–474, 479
See application file for complete search history.

(56) References Cited

U.S. PATENT DOCUMENTS

| | | | |
|---|---|---|---|
| 4,286,612 A * | 9/1981 | Neal | A01K 1/033 135/115 |
| 4,788,935 A * | 12/1988 | Bella | A01K 1/0125 119/168 |
| 5,094,188 A * | 3/1992 | Wolak | A01K 1/0125 119/168 |
| 5,361,725 A * | 11/1994 | Baillie | A01K 1/0107 119/161 |
| 6,176,201 B1 | 1/2001 | Fields | |
| 6,237,534 B1 | 5/2001 | Schwartz | |
| 6,945,193 B1 * | 9/2005 | Tanner | A01K 1/0107 119/165 |
| 7,059,272 B2 | 6/2006 | Helou | |
| 7,387,084 B2 | 6/2008 | Hildebrand et al. | |
| 7,481,182 B2 * | 1/2009 | Simpson | A01K 1/0125 119/168 |
| D664,312 S * | 7/2012 | Bizzle | D30/161 |

(Continued)

*Primary Examiner* — Yvonne R Abbott-Lewis
(74) *Attorney, Agent, or Firm* — Volpe Koenig

(57) ABSTRACT

A foldable animal litter containing apparatus is provided that is compact, and can be easily and quickly assembled by an owner. The apparatus includes a foldable cover having a first cover side, a second cover side, a third cover side, a fourth cover side, a cover top, and an open bottom, with an entrance defined in at least one of the cover sides. The apparatus also includes a foldable frame having at least two intermediary cross members located on a first side and a second side in a use position. The first side opposes the second side. The foldable frame supports the foldable cover. The apparatus includes a wall attached to the at least two intermediary cross members in the use position. The wall defines two internal compartments within the foldable cover in the use position and an internal pet opening between the two internal compartments.

17 Claims, 16 Drawing Sheets

(56) References Cited

U.S. PATENT DOCUMENTS

| | | | |
|---|---|---|---|
| 10,159,216 B2* | 12/2018 | Cantwell | A01K 1/034 |
| 11,006,609 B2* | 5/2021 | Jakubowski | A01K 1/0107 |
| 2003/0075115 A1* | 4/2003 | Thompson | A01K 1/0107 |
| | | | 119/482 |
| 2009/0064939 A1* | 3/2009 | Cirincione | A01K 1/033 |
| | | | 119/161 |

* cited by examiner

FOLDABLE ANIMAL LITTER CONTAINING APPARATUS

INCORPORATION BY REFERENCE

The following documents are incorporated herein by reference as if fully set forth: U.S. Provisional Patent Application No. 62/739,520, filed Oct. 1, 2018.

BACKGROUND

Crates, cages and other similar apparatus for housing and transporting pets are well-known in the art. These cages and crates can be rigid, or may be formed as a "soft" pet enclosure. In each case, the crate or cage is designed to contain a pet and includes sidewalls, a top, and a bottom, with one or more openable and closable doors located in the sidewalls or top.

Litter boxes for cats as well as training pads (puppy pads) and grass patches for dogs are also known which are, in effect, indoor bathrooms for pets. These are placed in a convenient place for pet use, which is preferably out of the way and also out of sight in the home. However, these indoor pet facilities are unsightly, can smell, and depending on the size of a pet owner's dwelling, are in plain sight. It should also be noted that some pets also are less stressed if they can relieve themselves in private.

What has also not been previously considered is that after pets are done utilizing the litter boxes or training pads, litter, or even pet feces, can be kicked out of the litter box or training pad, or tracked through the house by the pets' paws.

SUMMARY

In one aspect, the present invention provides a foldable animal litter containing apparatus that can be used in connection with a litter box, puppy pad, grass patch, or other indoor pet bathroom media, that provides an enclosed pet bathroom area compartment and an entrance and exit compartment that is easy for a pet to access, easy for an owner to clean, and also keeps any messes contained.

A foldable animal litter containing apparatus is provided that is compact for shipping, and can be easily and quickly assembled by an owner. The apparatus includes a foldable cover having a first cover side, a second cover side, a third cover side, a fourth cover side, a cover top, and an open bottom. The foldable cover has an entrance defined in at least one of the cover sides. The apparatus also includes a foldable frame that supports the foldable frame and includes at least two intermediary cross members. The at least two intermediary cross members are located on a first side and an opposing second side when the apparatus is in a use position. The foldable frame supports the foldable cover. A wall is attached to the at least two intermediary cross members when the apparatus is in the use position. The wall defines two compartments within the foldable cover and an internal pet opening between the two internal compartments when the apparatus is in the use position. The internal wall separates the litter box, puppy pad, grass patch, or other indoor pet bathroom media from the entrance, and forces the pet to walk through a first compartment and through an opening in the wall to get to the bathroom media, and then return the opposite way, requiring the pet to walk over a mat or other cleaning media that cleans their paws before exiting the foldable animal litter containing apparatus to ensure any mess remains inside the apparatus.

In one embodiment, the wall is removably attached to at least one of the at least two intermediary cross members. Preferably, the wall is foldable.

In one embodiment, the foldable frame has a height and a width. Optionally, the wall in the use position extends the height of the foldable frame and extends partially across the width of the foldable frame. Alternatively, the wall in the use position extends the height of the foldable frame and the width of the foldable frame and includes an opening defined therein as the internal pet opening.

In one embodiment, the apparatus also includes a litter box located in one of the two internal compartments. Moreover, the apparatus preferably has the entrance arranged to access the other one of the two internal compartments.

In one embodiment, the apparatus includes a zippered panel located in at least one of the first cover side, the second cover side, the third cover side, the fourth cover side, or the cover top.

In one embodiment, the apparatus includes a mat located under the foldable frame. The mat has a nonwoven mesh top. Preferably, the mat also has a waterproof bottom. This promotes trapping of any litter or feces on the pet's paws.

In one embodiment, the foldable cover is attachable to the foldable frame.

In one embodiment, the foldable cover may also have a mesh portion.

BRIEF DESCRIPTION OF THE DRAWINGS

The foregoing summary, as well as the following detailed description of the preferred embodiments of the invention will be better understood when read in conjunction with the appended drawings. For the purpose of illustrating the invention, there is shown in the drawings embodiments which are presently preferred. It should be understood, however, that the invention is not limited to the precise arrangement shown.

DETAILED DESCRIPTION

Figure 1:
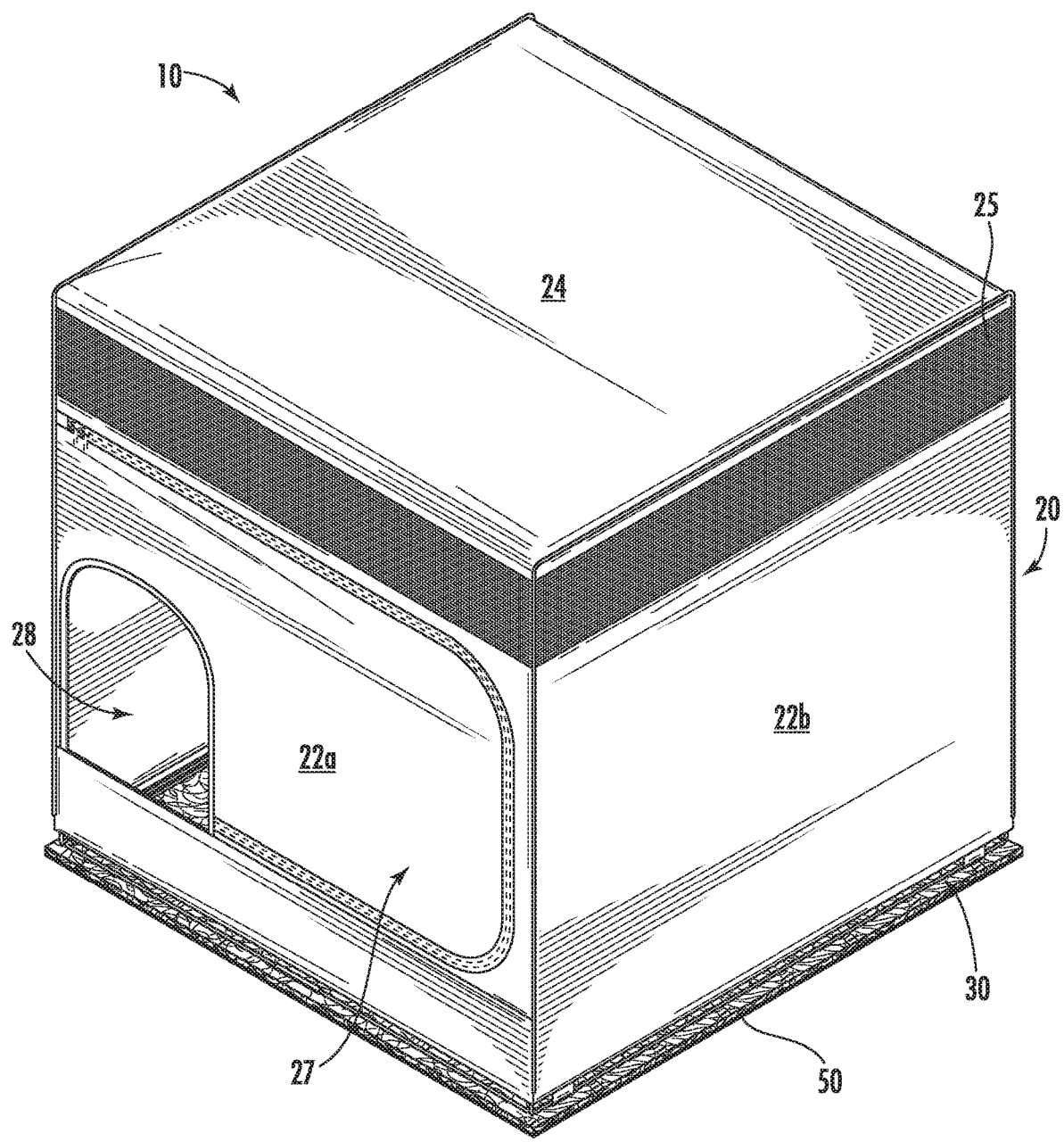
FIG. 1 is a top, front, right perspective view of a first embodiment of a foldable animal litter containing apparatus.
Figure 2:
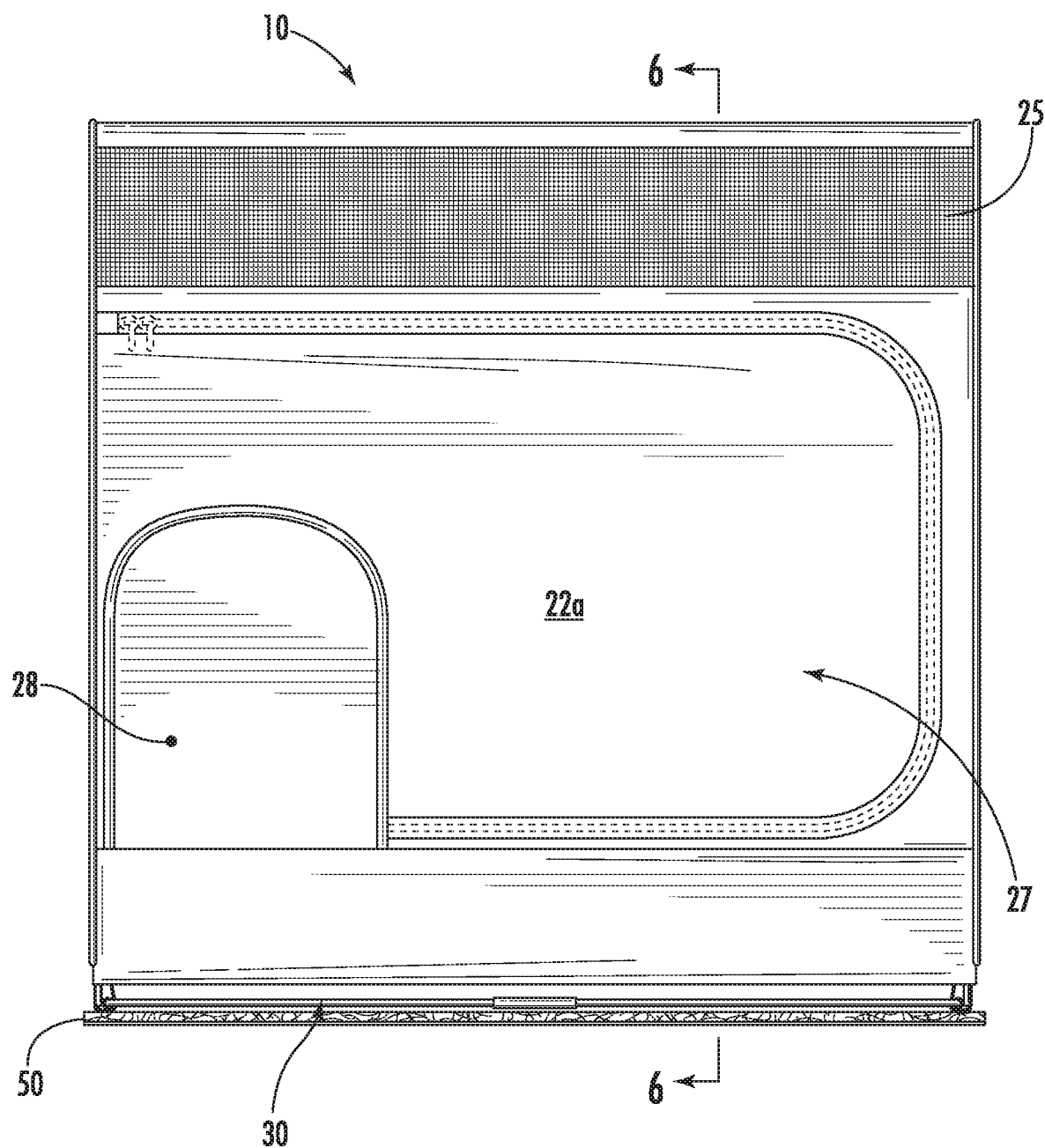
FIG. 2 is a front elevational view of the foldable animal litter containing apparatus.
Figure 3:
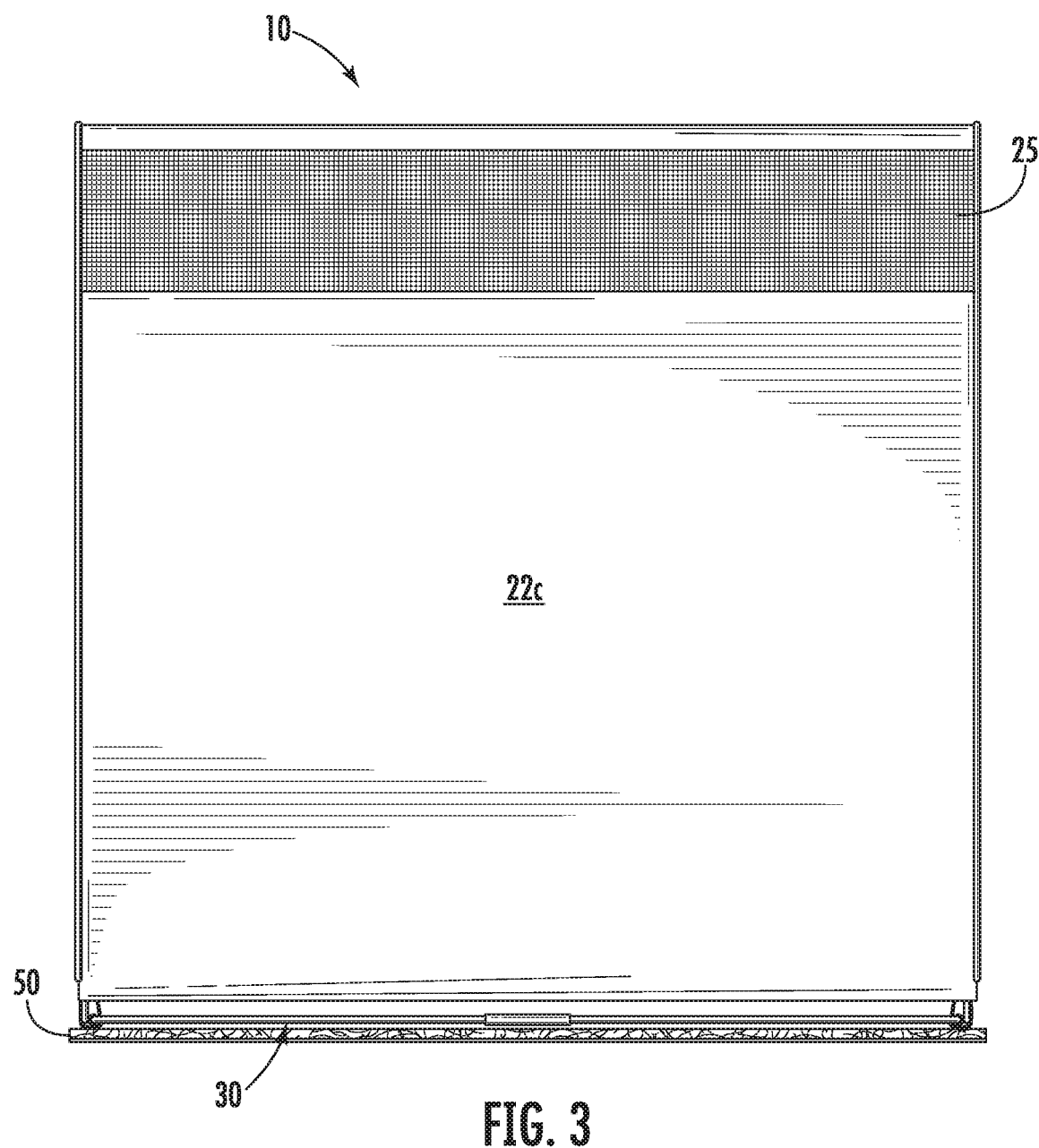
FIG. 3 is a rear elevational view of the foldable animal litter containing apparatus.
Figure 4:
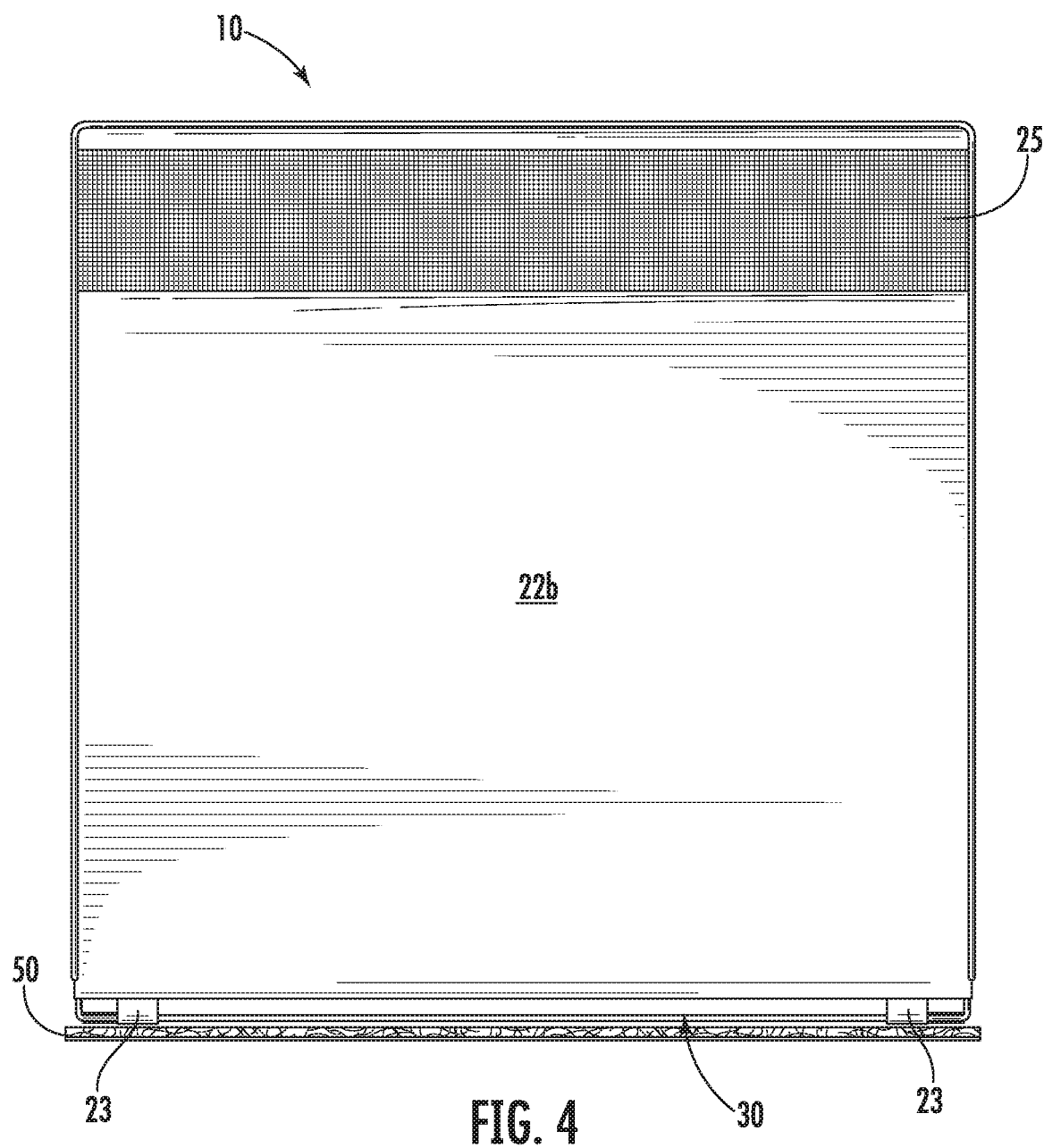
FIG. 4 is a right side elevational view of the foldable animal litter containing apparatus.
Figure 5:
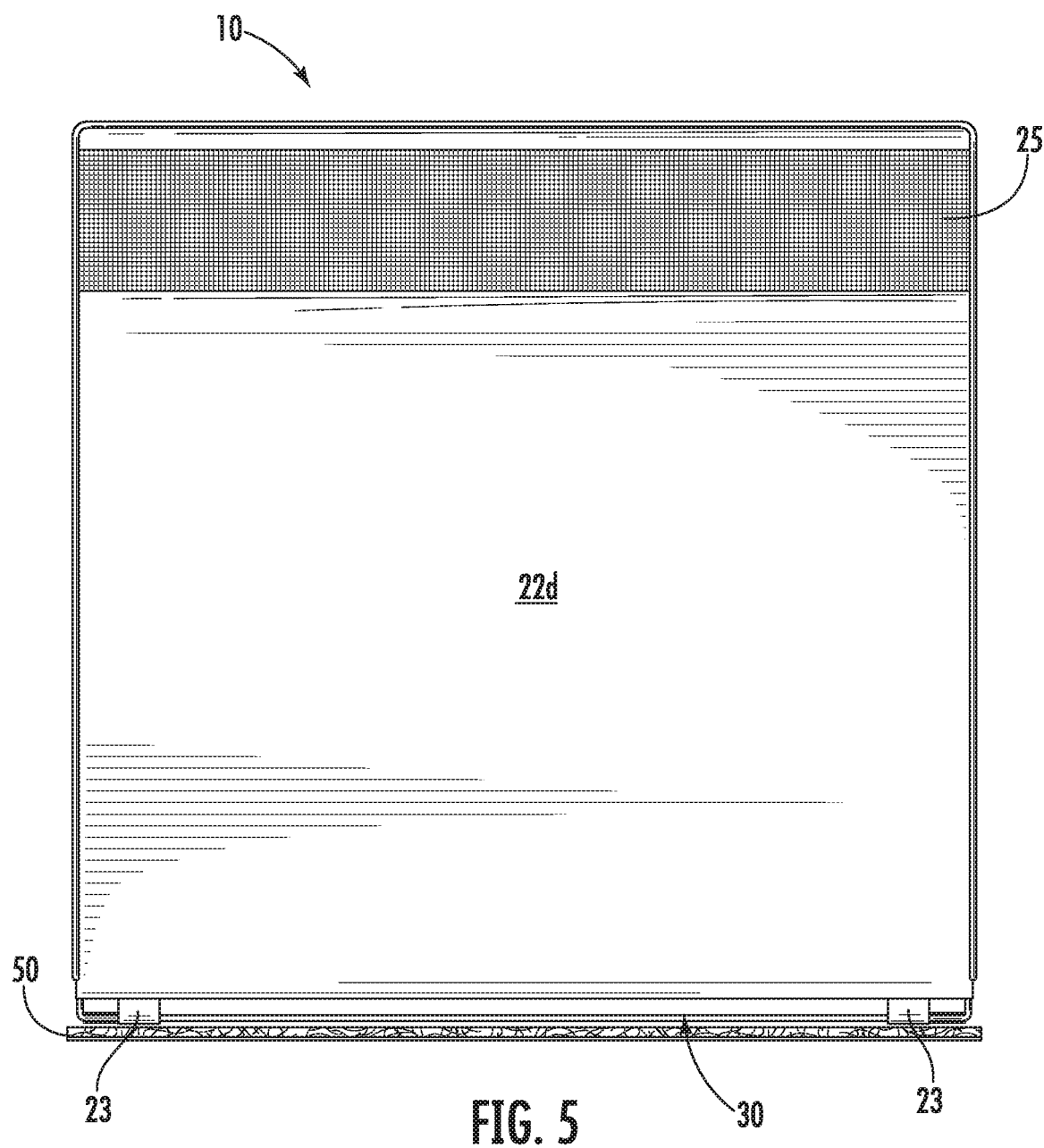
FIG. 5 is a left side elevational view of the foldable animal litter containing apparatus.

For purposes of this detailed description, words such as "front," "back," "top," "bottom," "left," and "right" designate directions in the drawings, and are used for convenience in referring to the designated parts or areas. The use of the terminology "at least one of" followed by a list of elements, such as "A, B, or C," means A, B, or C individually or various combinations thereof.

Referring to FIG. 1, an exemplary embodiment of a foldable animal litter containing apparatus 10 includes a foldable cover 20, shown in detail in FIGS. 2-5, 7, 13-14, and 16, a foldable frame 30, shown in detail in FIGS. 9-12, and 15, and a hidden wall 40, shown in detail in FIGS. 6, 13-14, and 16.

Referring to FIGS. 1-5, 7, 13-14, and 16, the foldable cover 20 includes a first cover side 22a, a second cover side 22b, a third cover side 22c, a fourth cover side 22d, a cover top 24, and an open bottom. The foldable cover 20 includes an entrance 28 in one of the cover sides 22a, although multiple openings could be provided, if desired. Preferably, the foldable cover 20 is attachable to the foldable frame 30. The foldable cover 20 may be attached to the foldable frame 30 by straps 23 along the bottom of the foldable cover 20, best shown in FIGS. 13-14 and 16. These straps 23 preferably include hook-end-loop textile fastening material, such as VELCRO® textile fasteners. Other types of connection to the frame could also be provided, such as snaps on multiple straps at each location that can be tied together. Preferably, the foldable cover 20 also has a mesh portion 25. This mesh portion 25 may allow additional light into the foldable cover 20 and may allow the pet's owner to see into the foldable cover 20. In a preferred embodiment, the foldable cover 20 also has a zippered panel 27. The zippered panel 27 may be located in at least one of the cover sides 22a-d or the cover top 24. The zippered panel 27 allows the pet owner to access the inside of the foldable cover 20 when the zippered panel 27 is unzipped. Moreover, the zippered panel 27 enables the pet owner to quickly and easily clean or replace litter or puppy pads without disassembling or moving the foldable animal litter containing apparatus 10.

The foldable cover 20 can be made of canvas, vinyl, or any suitable woven or non-woven material and is preferably sewn together at the interfaces between the cover sides 22a-d and the cover top 24. Reinforcements may be provided at the corners. The straps 23 hold the foldable cover 20 in position on the foldable frame 30 as it is moved between a collapsed position through an intermediate position, to a use position as shown in FIG. 1. The straps 23 allow the foldable cover 20 to be removed from the foldable frame 30 so that it can be washed or otherwise cleaned as necessary.

Figure 9:
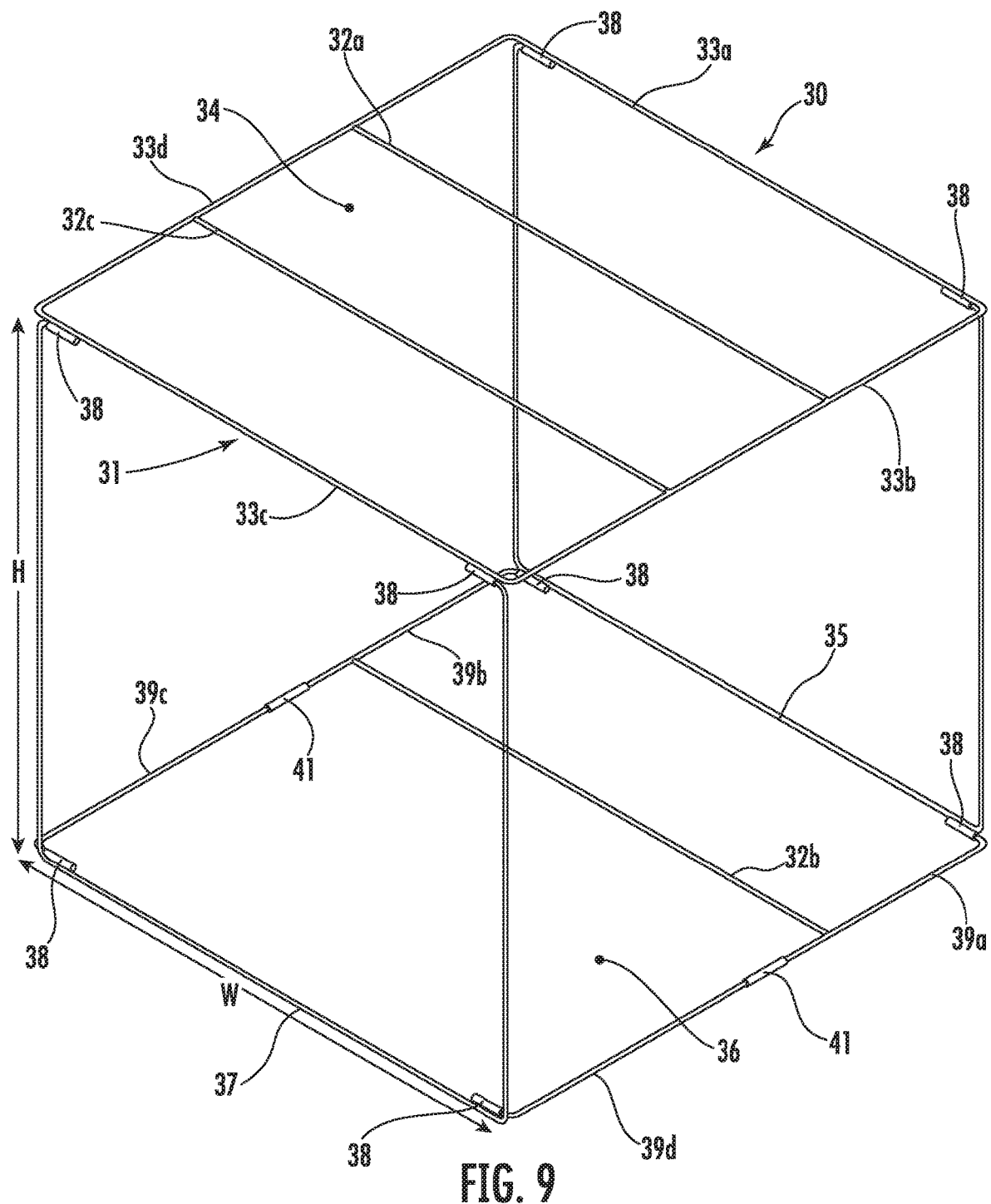
FIG. 9 is a top, front, right perspective view of the foldable frame in a use position.
Figure 15:
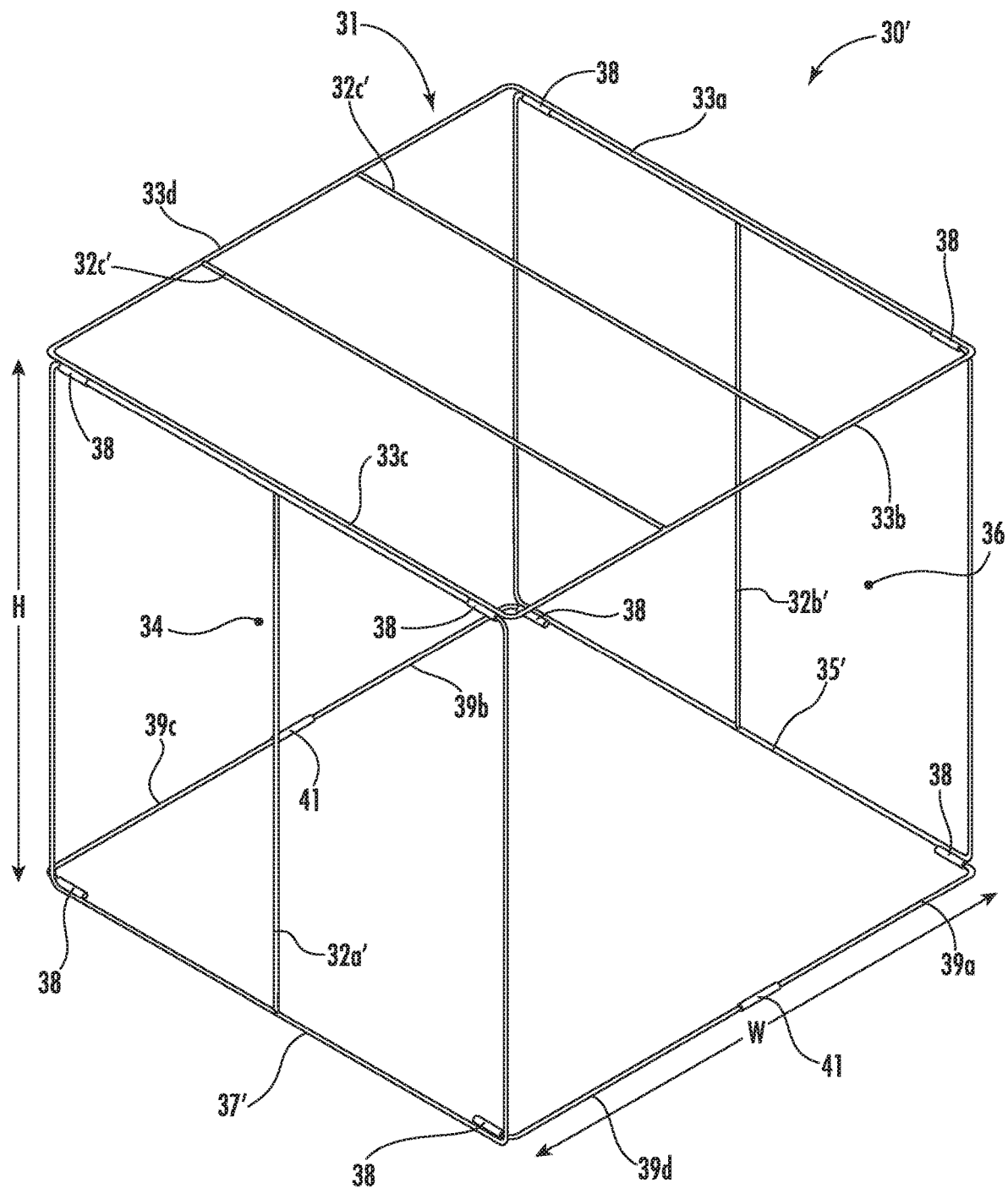
FIG. 15 is a top, front, right perspective view of an alternative foldable frame in the use position.

Referring now to FIGS. 9-12 and 15, a first embodiment of the foldable frame 30 that supports the foldable cover 20 is shown in detail without the foldable cover 20 installed. Preferably, the foldable frame 30 creates a cube or rectangular prism shape when in the use position. The foldable frame 30 includes a first side 34 and a second side 36. The first side 34 opposes the second side 36 when the foldable frame 30 is in the use position, as shown in FIGS. 9 and 15. The foldable frame 30 also includes at least two intermediary cross members 32a and 32b, which are preferably parallel. The at least two intermediary cross members 32a and 32b are located on the first side 34 and the second side 36 when the frame is in a use position, as shown in FIGS. 9 and 15. Additional intermediary cross members 32c may be added for additional support. As shown in FIG. 9, the first side 34 can be the top and the second side 36 can be the bottom in the use position. However, as discussed in further detail below, the first side 34 and the second side 36 can form opposing sides, as shown in FIG. 15.

Figure 10:
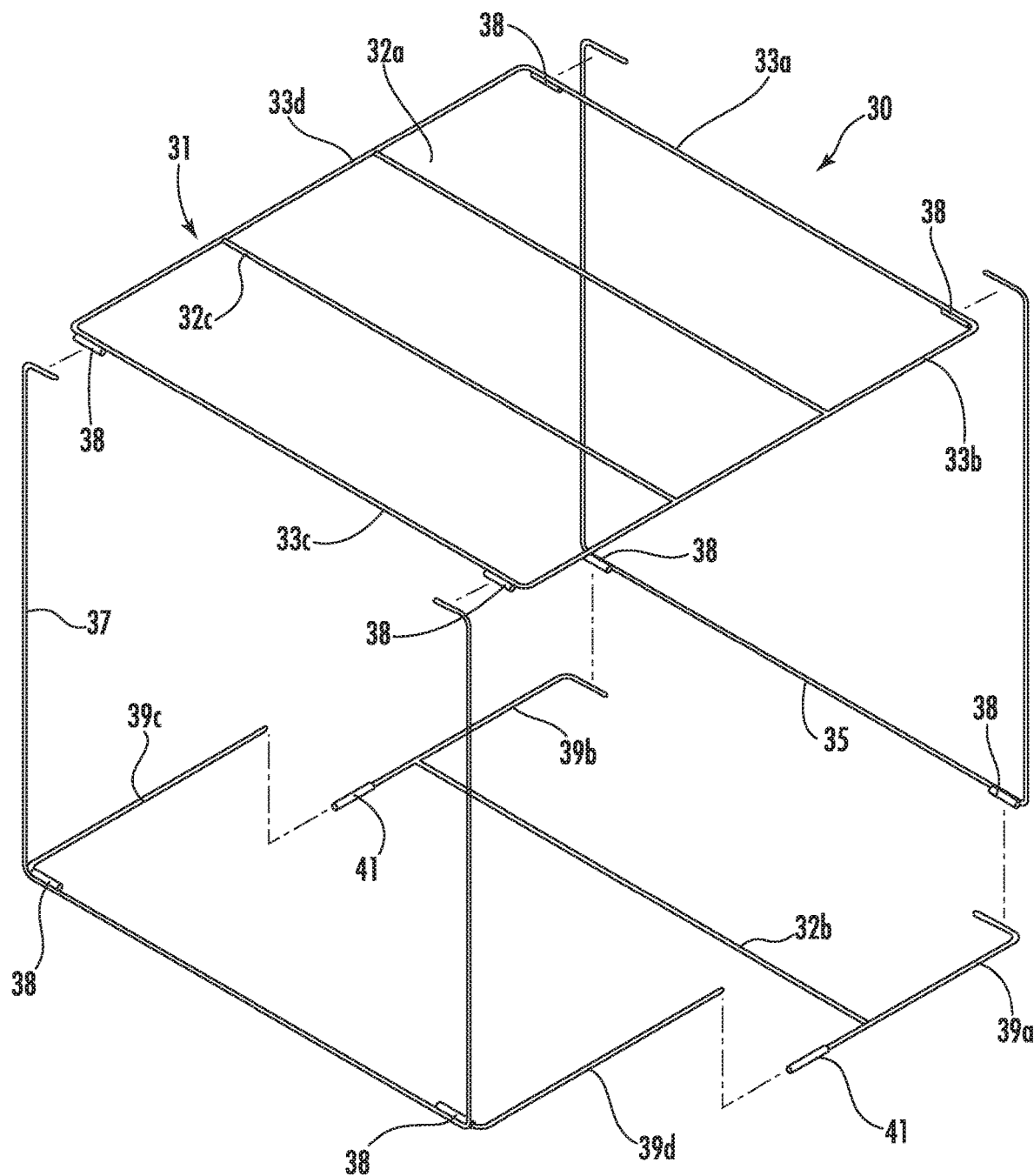
FIG. 10 is a top, front, right perspective view of the foldable frame, shown partially exploded, that can be used in connection with an embodiment of the foldable animal litter containing apparatus.

Referring to FIGS. 9,10, and 15, the foldable frame 30 also includes a top frame 31, preferably comprising four edge members 33a-33d that are connected together to define a generally rectilinear structure. Referring to FIGS. 9 and 10, preferably, one of the at least two intermediary cross members 32a is connected between two edge members 33b, 33d. First and second side members 35, 37 are connected to the top frame 31. The connection of the first and second side members 35, 37 to the top frame 31 is preferably via a pivotal connection on opposite sides of the edge members 33a and 33c. This pivoting can be accomplished using hinge barrels 38 connected to the edge members 33a and 33c, and the first and second side frame 35, 37 may include bent ends that are engaged in the hinge barrels 38 to allow pivoting movement. Other types of pivoting connectors could also be used. The first and second side frames 35, 37 are preferable U-shaped and the bent ends are located at the two ends of the "U."

Referring to FIG. 15, alternatively, in a second embodiment the foldable frame 30' has a first and second side frames 35', 37' that form a rectangular structure. In this embodiment, one of the at least two intermediary cross members 32a' is connected between the top and bottom members of the second side frame 37' on the first side 34, and one of the at least two intermediary cross members 32b' is connected between the top and bottom members of the first side frame 35' on the second side 36. This embodiment preferably includes additional intermediary cross members 32c' between two edge members 33b, 33d to support the foldable cover 20. Additionally, the first and second side frames 35', 37' are connected to the top frame 31. The connection of the first and second side members 35', 37' to the top frame 31 is preferably via a pivotal connection on opposite sides of the edge members 33a and 33c. Preferably, the first and second side members 35', 37' are connected to the top frame 31 by hinges 38, although other types of pivotal connectors could be used.

Figure 11:
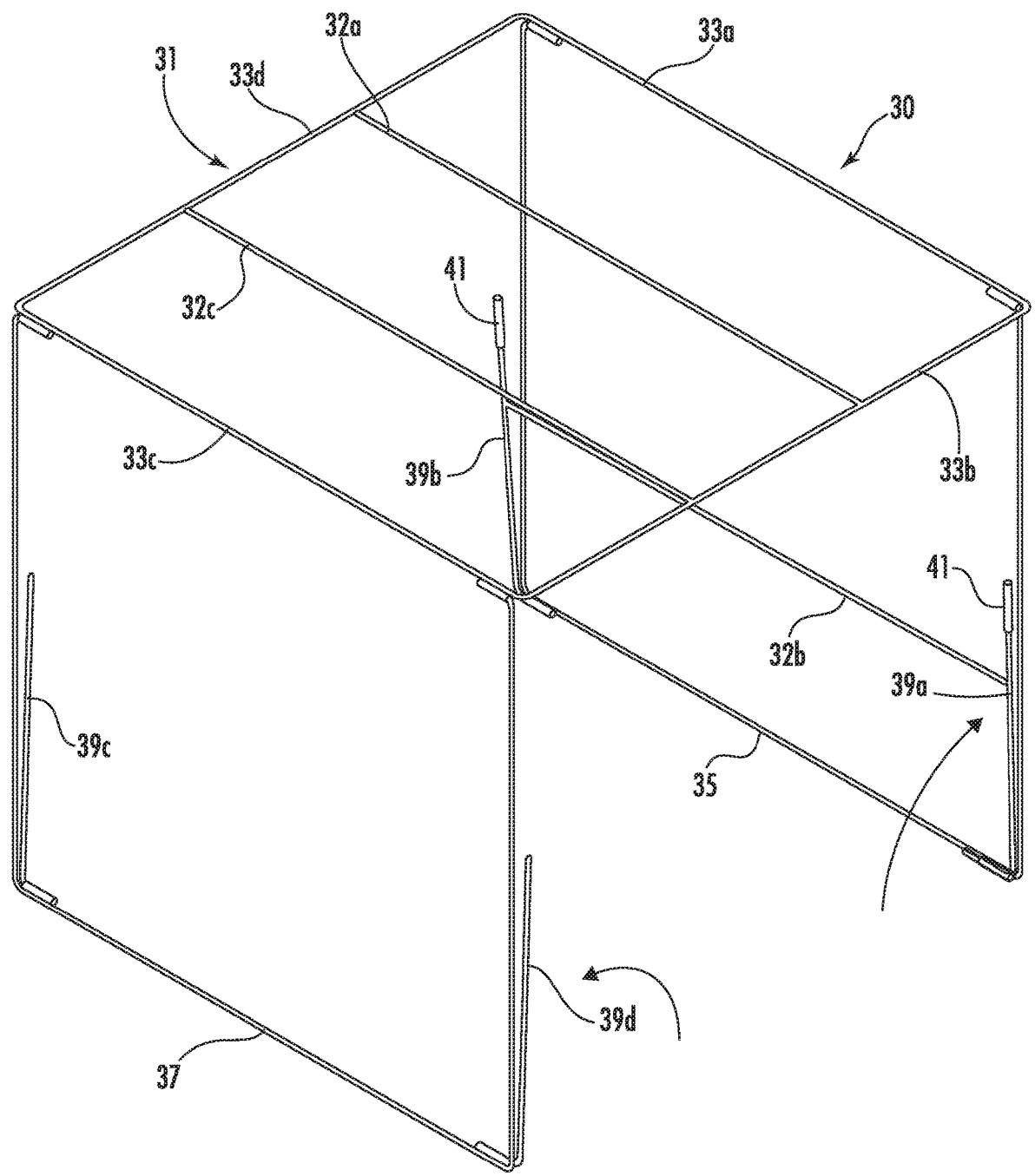
FIG. 11 is a top, front, right perspective view of the partially unassembled foldable frame.
Figure 12:
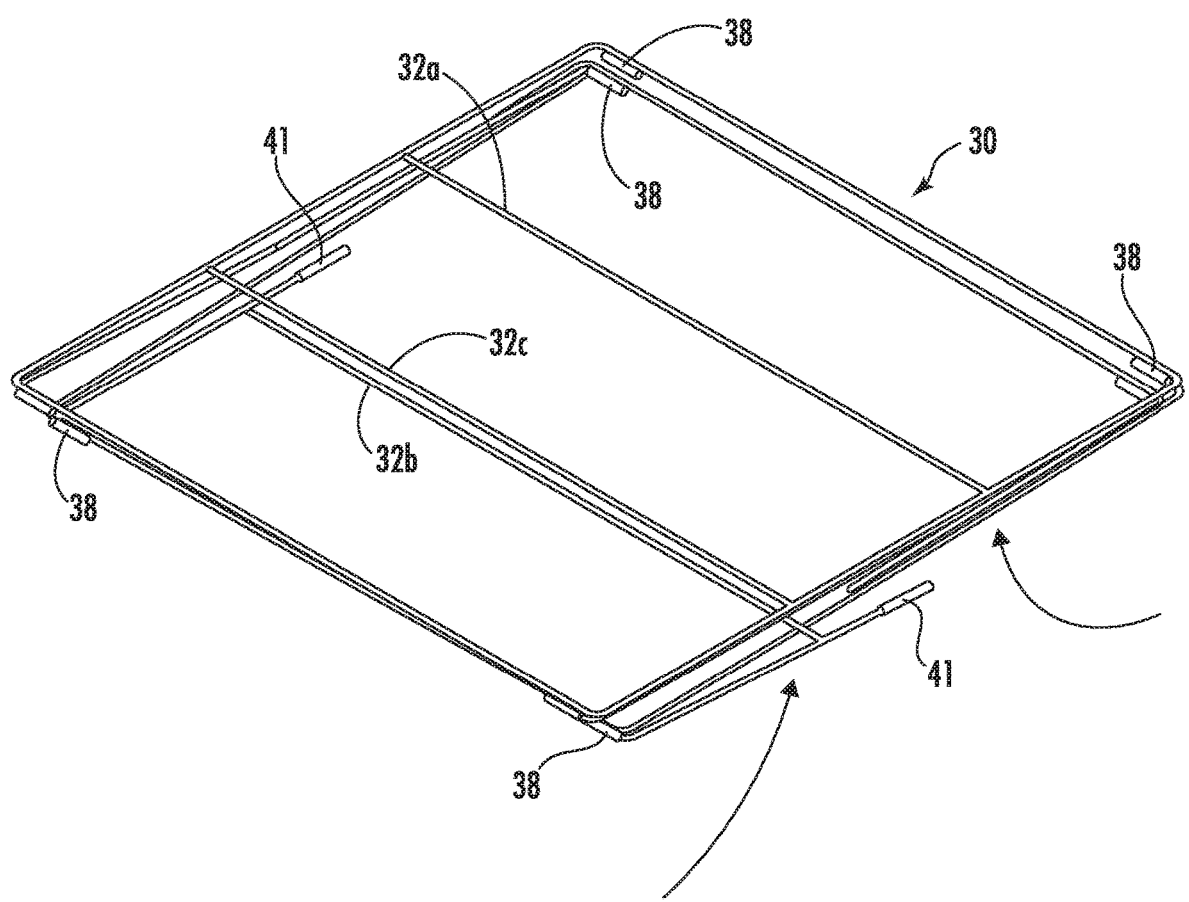
FIG. 12 is a top, front, right perspective view of the foldable frame in a collapsed position.

Referring to FIGS. 9-10, and 15, the foldable frame 30, 30' also includes a first bottom frame member 39a, a second bottom frame member 39b, and a third bottom frame member 39c, and a fourth bottom frame member 39d. Each bottom frame member 39a-d has a bent end and a straight end. Preferably, the first and second bottom frame members 39a, 39b are connected to the first side member 35, 35', while the third and fourth bottom frame members 39c, 39d are connected to the second side member 37, 37'. In the first embodiment 30, one of the at least two intermediary cross members 32b is connected between two bottom frame members 39a, 39b, as shown in FIGS. 9 and 10. The connection between side members 35, 35', 37, 37' and the bottom frame members 39a-d are preferably via pivotal connections at the bottom corners of the side members 35, 35', 37, 37'. This pivoting can be accomplished using hinge barrels 38 connected to the bottom corners of the side members 35, 35', 37, 37', and the bent ends of the bottom frame members 39a-d are engaged in the hinge barrels 38 to allow pivoting movement. The pivoting movement of the bottom frame members 39a-d with the side frames 35, 35', 37, 37' is shown in FIG. 11. The first and fourth bottom frame members 39a, 39d connect together and the second and third bottom frame members 39b, 39c connect together when the foldable frame 30, 30' is in the use position. Preferably, the first and second bottom frame members 39a, 39b include connector sleeves 41 at the ends opposite the bent ends. The straight ends of the third and fourth bottom members 39c, 39d may engage with the connector sleeves 41 on the first and second bottom members 39a, 39b when the foldable frame 30 is in the use position. The connector sleeves 41 can be spring loaded and biased outwardly to allow sliding back while the ends of the first and fourth bottom frame members 39a, 39d and the second and third bottom frame members 39b, 39c are aligned, and then slide back into position. The connector sleeves 41 could also be fixed to the ends of 39a, 39b and the ends of 39c, 39d "sprung" into the open ends of the connector sleeves 41 via the resilient deflection of the frame members pushing out against the foldable cover 20 positioned on the foldable frame 30, 30' to make the connections. Preferably, the foldable frame 30, 30' in the use position has a height H and a width W. Preferably, the foldable frame 30, 30' can be disassembled by reversing the connection of the bottom frame members 39a-d by pulling the ends from the connector sleeves 41 and folded to a collapsed position, as shown in FIG. 12 without the foldable cover 20. This collapsed position allows the foldable frame 30, 30' and attached foldable cover 20 to be shipped or transported quickly and easily.

As shown in FIGS. 9-12 and 15, the foldable frame 30, 30' is preferably formed of solid wire bar-stock. However, it could be made of tubular stock. In a preferred embodiment, the bar-stock is formed of steel. However, it could be made of other materials, such as fiberglass, if desired.

Figure 6:
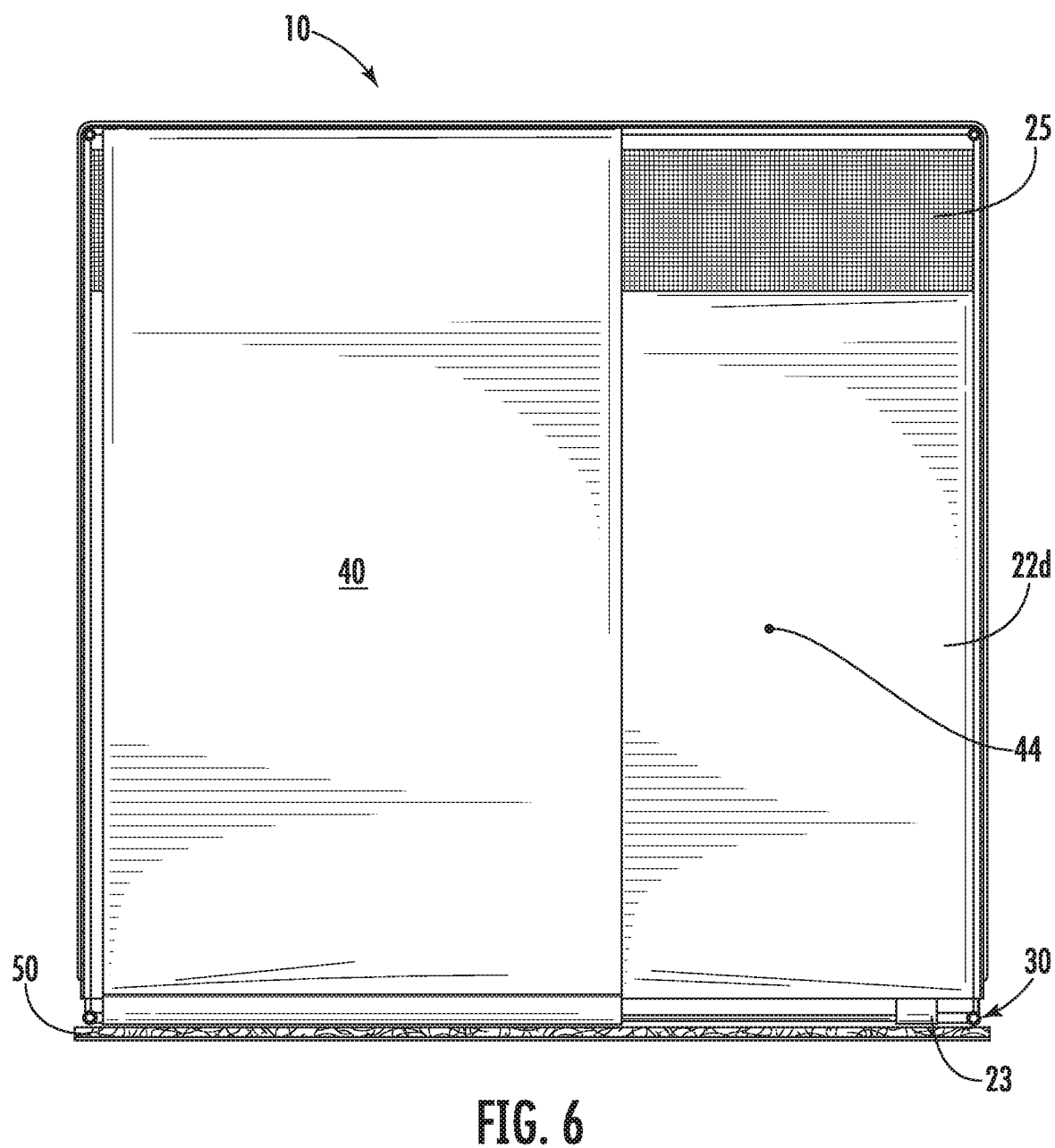
FIG. 6 is a right side elevational view of the foldable animal litter containing apparatus without the right cover side to show the foldable wall and internal pet opening.
Figure 7:
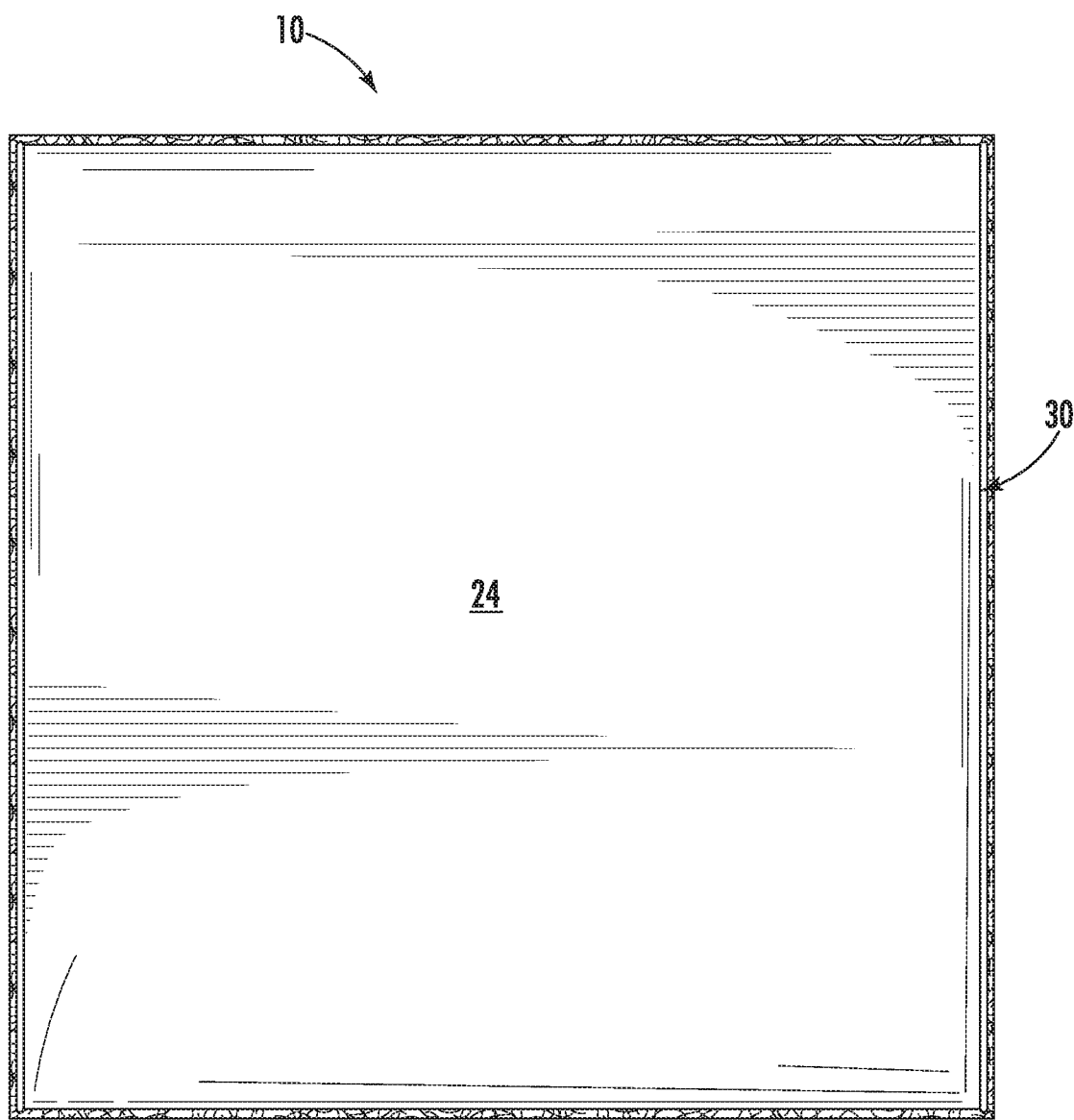
FIG. 7 is a top view of the foldable animal litter containing apparatus.
Figure 13:
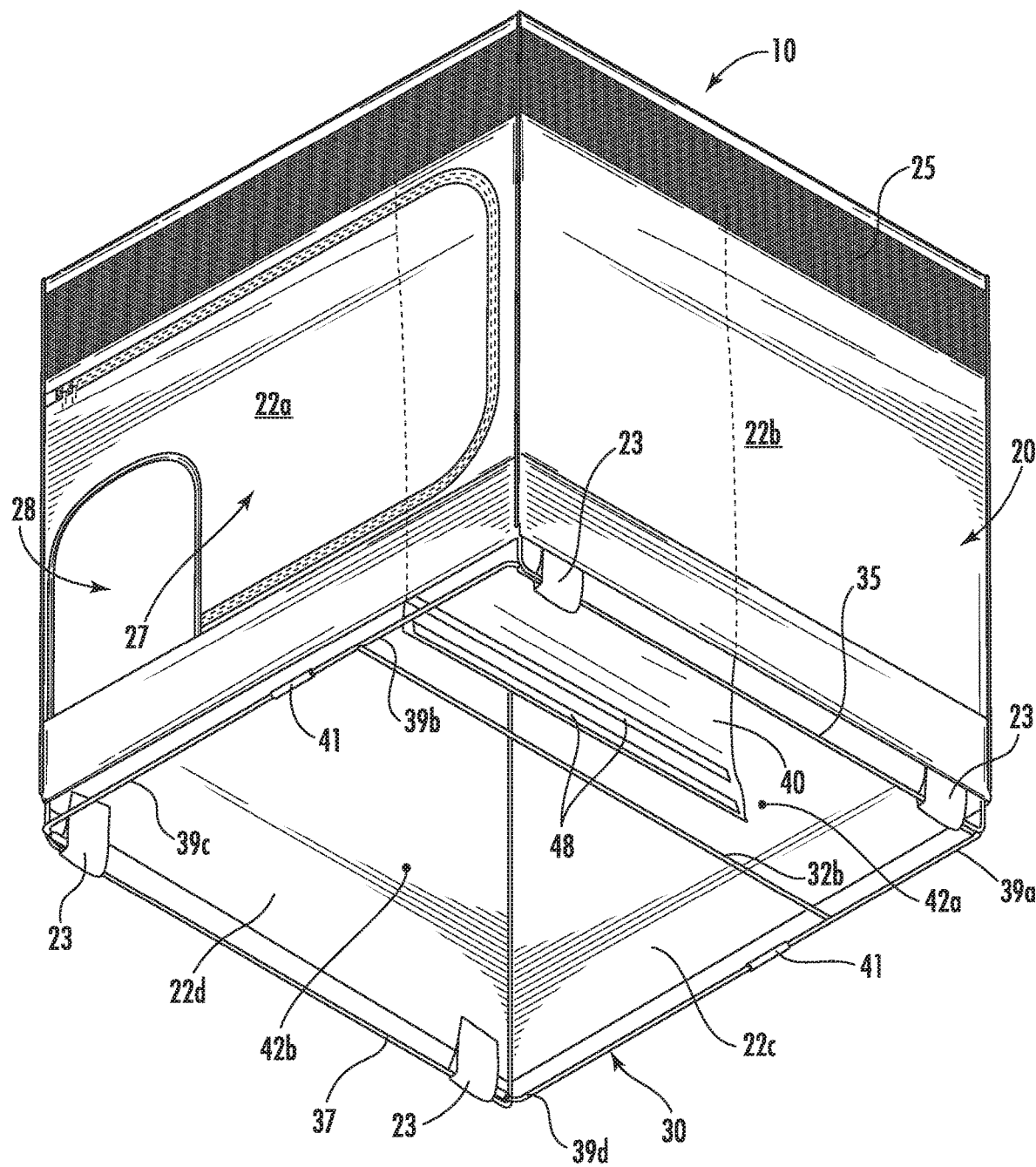
FIG. 13 is a bottom, front, right perspective view of the foldable animal litter containing apparatus with a partially unattached foldable wall.
Figure 14:
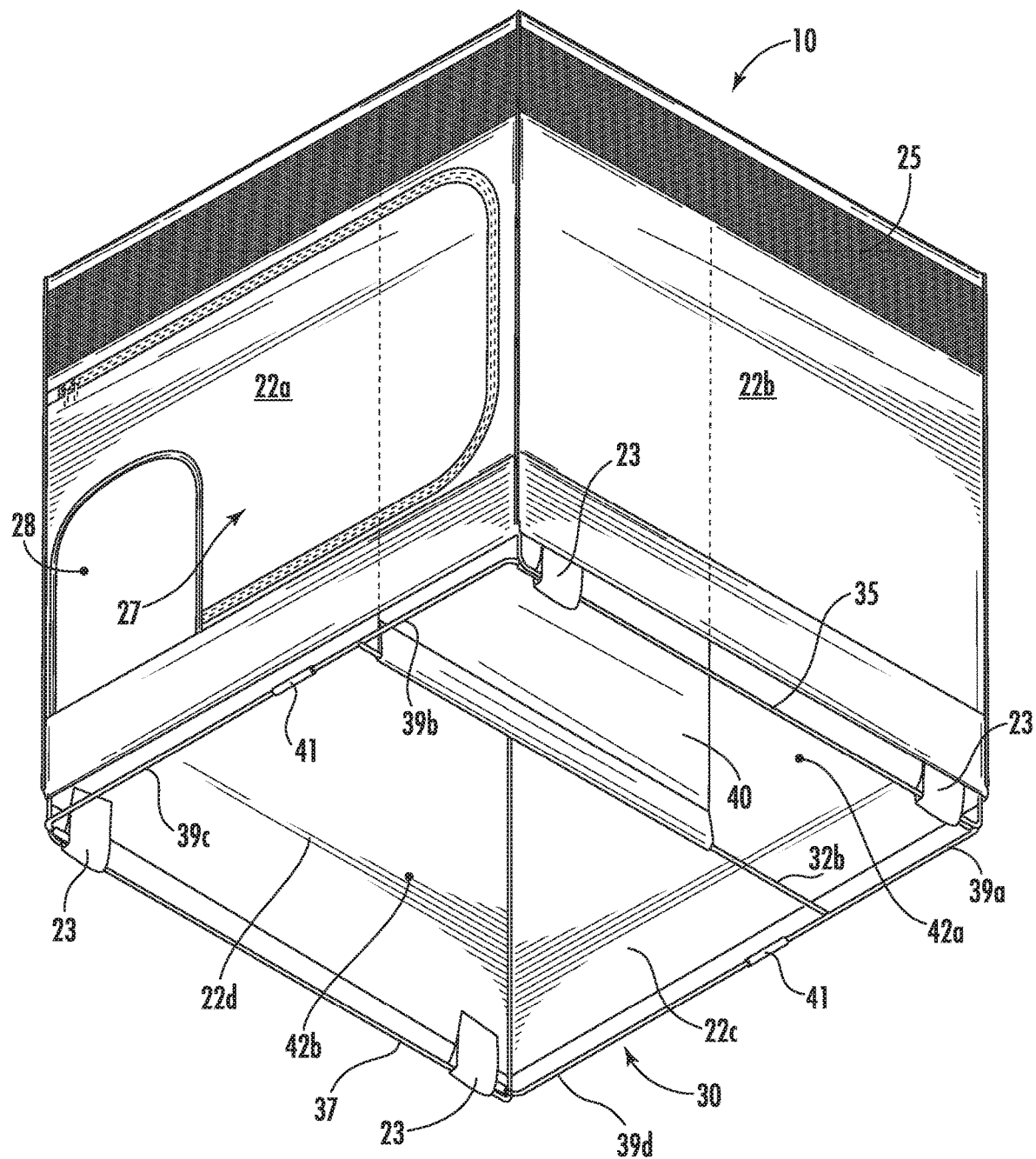
FIG. 14 is a bottom, front, right perspective view of the foldable animal litter containing apparatus with an attached foldable wall.
Figure 16:
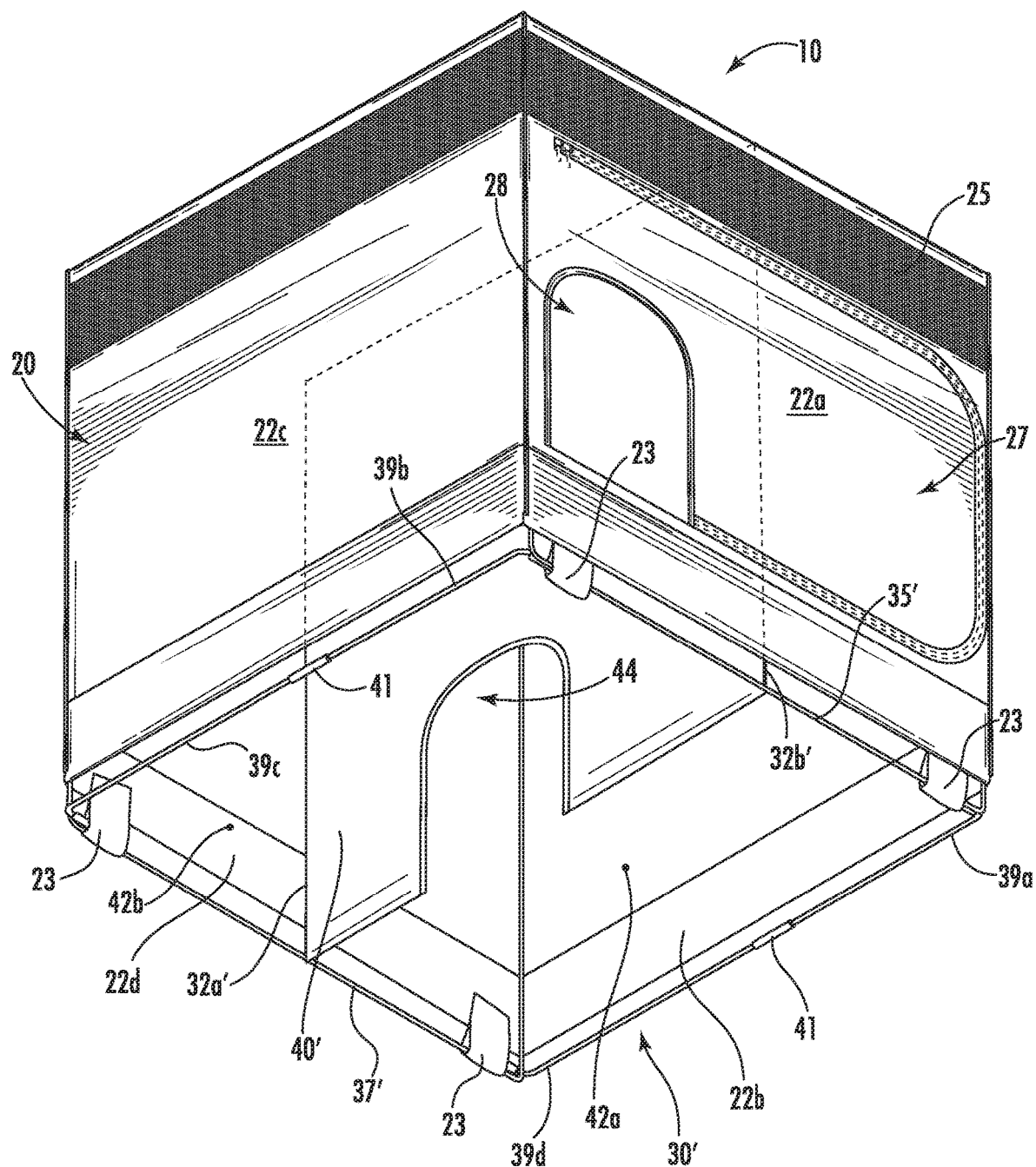
FIG. 16 is a bottom, front, right perspective view of an alternative foldable animal litter containing apparatus with an attached foldable wall.

Referring now to FIGS. 6, and 13-14, a first embodiment of the wall 40 used with the foldable frame 30 is shown in detail. The wall 40 attaches to the at least two intermediary cross members 32a, 32b when the foldable frame 30 is in the use position. When the wall 40 is attached to the at least two intermediary cross members 32a, 32b, the wall 40 defines two internal compartments 42a, 42b within the foldable cover 20 when the foldable cover 20 is in the use position. Moreover, the wall 40 defines an internal pet opening 44 between the two internal compartments 42a, 42b. In the first embodiment, the wall 40 extends the entire height H of the foldable frame 30 and extends partially across the width W of the foldable frame 30 when attached to the at least two intermediary cross members 32a, 32b when in the use position as shown in FIG. 6 and FIG. 14. Alternatively, in a second embodiment, the wall 40' in the use position is connected to the at least two intermediary cross members 32a', 32b' and extends the entire height H and width W of the foldable frame 30' and include an open space as the internal pet opening 44, as shown in FIG. 16. In a preferred embodiment, the wall 40, 40' is removably attached to at least one of the at least two intermediary cross members 32a, 32b as shown in FIG. 13. Preferably, at least one end of the wall 40, 40' includes a hook-and-loop textile fastening material 48, such as VELCRO® textile fasteners. When the foldable frame 30, 30' is in the use position, the end of the wall 40, 40' wraps around one of the at least two intermediary cross members 32b, 32b' and the hook-and-loop textile fastening material 48 is engaged to hold the wall 40, 40' in position. For folding of the apparatus 10, this connection can be released so that the wall 40, 40' is detached at one or both ends to allow folding of the cover 20 and foldable frame 30, 30'. The wall 40, 40' is preferably foldable and is formed of a foldable material such as canvas, vinyl, or any suitable woven or non-woven material. Alternatively, the wall 40, 40' can be made of a plastic material that can be clipped or otherwise attached to the intermediary cross members.

In one embodiment, the foldable animal litter containing apparatus 10 also includes a litter box. The litter box is located in one of the two internal compartments 42a. Preferably, the entrance 28 of the apparatus is arranged to access the other one of the internal compartments 42b. In this embodiment, shown in FIGS. 13-14 and 16, the entrance 28 gives the pet access to one of the two internal compartments 42b, while the litter box (not shown) is located in the other one of the two internal compartments 42a.

Figure 8:
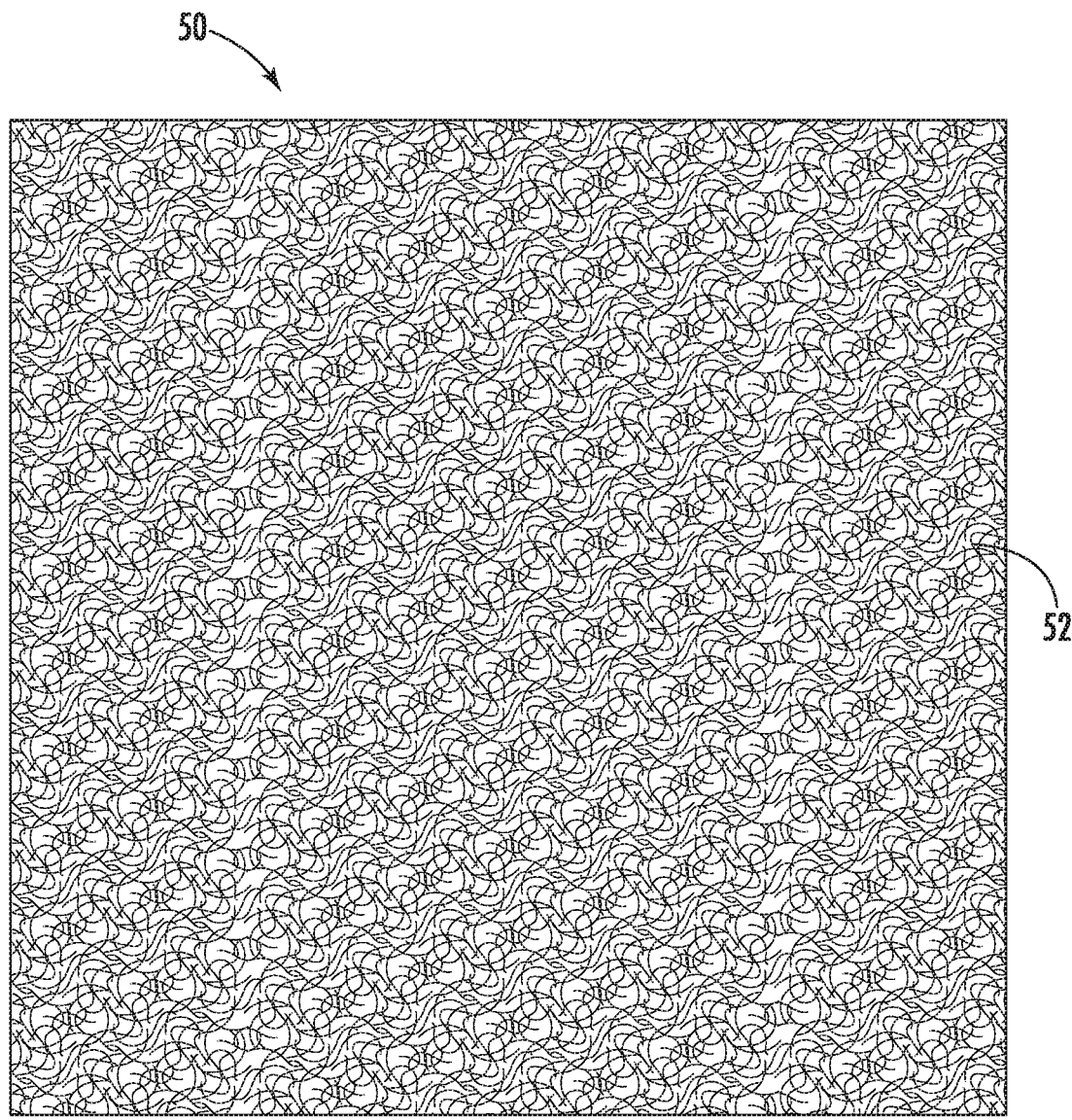
FIG. 8 is a top view of a mat used in connection with an embodiment of the foldable animal litter containing apparatus.

Now referring to FIG. 8, the apparatus may also include a mat 50. The mat 50 has a nonwoven mesh top 52, as shown in FIG. 8. Preferably, the mat 50 also has a waterproof bottom. In one embodiment, the mat 50 is located under the litter box, the foldable cover 20, and the foldable frame 30 when in the use position as shown in FIGS. 1-6. Preferably, the mat 50 is made of a polymeric material to allow for easy cleaning.

In use, the mat 50 is placed on a floor or surface, the foldable frame 30 with attached foldable cover 20 is assembled and placed on the mat 50, and the wall 40 is then attached to the foldable frame 30. A litter box or puppy pad is placed into one of the two internal compartments 42a opposite from the entrance 28. The pet can then use the foldable animal litter containing apparatus in privacy and any mess is contained and hidden within the apparatus 10. Further, the pet is forced to walk across the mat 50 through the compartment 42b without the litter box or pad, thereby wiping the pet's paws. The foldable animal litter containing apparatus provides for reduced stress and easier bathroom usage for the pet as well as easier clean up and maintenance by the owner. Additionally, the foldable cover 20, wall 40, 40', and foldable frame 30, 30' can collapse and fold in on itself for easy storage and transportation.

Having thus described in detail a preferred selection of embodiments of the present invention, it is to be appreciated and will be apparent to those skilled in the art that many physical changes could be made to the foldable animal litter containing apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A foldable animal litter containing apparatus, comprising:
   a foldable cover having a first cover side, a second cover side, a third cover side, a fourth cover side, a cover top, and an open bottom, with an entrance defined in at least one of the cover sides;
   a foldable frame that supports the foldable cover and includes at least two intermediary cross members located on a first side and a second side in a use position;

the first side opposes the second side;

the foldable frame supports the foldable cover; and a foldable wall extending between two of the intermediary cross members, the foldable wall is removably attached to at least one of the at least two intermediary cross members in the use position using a hook-and-loop textile fastening material, the foldable wall defining two internal compartments within the foldable cover in the use position and an internal pet opening between the two internal compartments.

2. The apparatus of claim 1, wherein the first side and the second side are located at a top and a bottom of the foldable frame in the use position.

3. The apparatus of claim 2, wherein the foldable frame has a height and a width, and the foldable wall in the use position extends the height of the foldable frame and extends only partially across the width of the foldable frame.

4. The apparatus of claim 1, wherein the first side and the second side are located at opposing ones of the cover sides.

5. The apparatus of claim 1, wherein the foldable frame has a height and a width, and the foldable wall in the use position extends the height of the foldable frame and the width of the foldable frame and includes an open space as the internal pet opening.

6. The apparatus of claim 1, further comprising a litter box located in one of the two internal compartments.

7. The apparatus of claim 6, wherein the entrance is arranged to access an other one of the internal compartments.

8. The apparatus of claim 1, further comprising a zippered panel located in at least one of the first cover side, the second cover side, the third cover side, the fourth cover side, or the cover top.

9. The apparatus of claim 8, wherein the mat has a waterproof bottom.

10. The apparatus of claim 1, further comprising a mat located under the frame, the mat has a nonwoven mesh top.

11. The apparatus of claim 1, wherein the foldable cover is attachable to the foldable frame.

12. The apparatus of claim 1, wherein the foldable cover has a mesh portion.

13. The apparatus of claim 1, wherein the at least two intermediary cross members are parallel.

14. The foldable animal litter containing apparatus of claim 1, wherein the foldable animal litter containing apparatus is foldable while the foldable cover is attached to the foldable frame and the foldable wall is attached to one of the at least two intermediary cross members.

15. The foldable animal litter containing apparatus of claim 1, wherein foldable wall is removably attached to only one of the at least two intermediary cross members.

16. A foldable animal litter containing apparatus, comprising:

a foldable cover having a first cover side, a second cover side, a third cover side, a fourth cover side, a cover top, and an open bottom, with an entrance defined in at least one of the cover sides;

a foldable frame that supports the foldable cover, the foldable frame includes a top frame, first and second side members pivotally connected at opposite sides of the top frame, and first and second bottom frame members connected to the first side member, and third and fourth bottom frame members connected to the second side member, the first and fourth bottom frame members being connectable and the second and third bottom frame members being connectable to place the foldable frame in the use position, an intermediary cross member extends between the first and second bottom frame members and another intermediary cross member is connected to the top frame;

the foldable frame supports the foldable cover; and a foldable wall that extends between the intermediary cross members, the foldable wall is removably attached to at least one of the intermediary cross members in the use position, the wall defining two internal compartments within the foldable cover in the use position and an internal pet opening between the two internal compartments.

17. The apparatus of claim 16, wherein the foldable frame has a height and a width, and the foldable wall in the use position extends the height of the foldable frame and extends only partially across the width of the foldable frame.

* * * * *